United States Patent
Trani

(10) Patent No.: US 9,697,656 B2
(45) Date of Patent: Jul. 4, 2017

(54) METHOD AND SYSTEM FOR ACCESS CONTROL PROXIMITY LOCATION

(71) Applicant: Sensormatic Electronics, LLC, Boca Raton, FL (US)

(72) Inventor: James Trani, Billerica, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 14 days.

(21) Appl. No.: 14/605,165

(22) Filed: Jan. 26, 2015

(65) Prior Publication Data

US 2016/0055692 A1 Feb. 25, 2016

Related U.S. Application Data

(60) Provisional application No. 62/039,039, filed on Aug. 19, 2014, provisional application No. 62/045,939, filed on Sep. 4, 2014.

(51) Int. Cl.
*G05B 19/16* (2006.01)
*G07C 9/00* (2006.01)
(Continued)

(52) U.S. Cl.
CPC ..... *G07C 9/00007* (2013.01); *G07C 9/00174* (2013.01); *H04B 7/04* (2013.01);
(Continued)

(58) Field of Classification Search
CPC .......... G05B 2219/2642; H04W 4/008; H04W 88/02; H04W 12/06; H04W 12/08;
(Continued)

(56) References Cited

U.S. PATENT DOCUMENTS 8,430,310 B1    4/2013  Ho et al.
2005/0062649 A1  3/2005  Chiang et al.
(Continued)

FOREIGN PATENT DOCUMENTS

EP   1981183 A2  10/2008
GB   2468731 A    9/2010
WO   9606409 A1   2/1996

OTHER PUBLICATIONS

"Apriva Reader." Apriva. Retrieved from http://www.apriva.com/iss/solutions/apriva-reader. 2 pages. Dec. 2014.
(Continued)

*Primary Examiner* — Tesfaldet Bocure
(74) *Attorney, Agent, or Firm* — HoustonHogle LLP

(57) ABSTRACT

A system for a frictionless access control automatically identifies users and enables access to restricted areas of a building for example via access points such as locked doors. The system allows access when authorized users are in the vicinity of doors without requiring the users to swipe access keycards (or badges) at keycard terminals located at the doors, as in current systems. The system includes user devices such as key fobs and mobile phones that wirelessly broadcast user information and unique IDs for each of the devices in data packets, which are received by positioning units. The positioning units determine locations of the user devices, and send the packet data and the location data to a verification and tracking system. Preferably, the positioning units include two or more antennas that determine close proximity of users to access points while also allowing the system to continuously monitor the locations of the users.

21 Claims, 15 Drawing Sheets

(51) Int. Cl.
  *H04B 7/04* (2017.01)
  *H04W 4/00* (2009.01)
  *H04W 4/02* (2009.01)

(52) U.S. Cl.
  CPC ........... *H04W 4/008* (2013.01); *H04W 4/023* (2013.01); *G07C 2009/00317* (2013.01); *G07C 2009/00333* (2013.01); *G07C 2009/00769* (2013.01)

(58) Field of Classification Search
  CPC .... H04W 4/023; H04L 67/12; G07C 9/00007; G07C 9/00174; G07C 2009/00769; G07C 2009/00317; G07C 2009/00333; H04B 7/04
  USPC ........................... 340/5.3, 5.61, 5.64, 539.14
  See application file for complete search history.

(56) References Cited

U.S. PATENT DOCUMENTS

| | | | |
|---|---|---|---|
| 2006/0270458 A1 | 11/2006 | Watanabe | |
| 2006/0279422 A1 | 12/2006 | Sweatte | |
| 2007/0109111 A1* | 5/2007 | Breed | B60N 2/2863 340/435 |
| 2010/0094482 A1* | 4/2010 | Schofield | G08G 1/205 701/2 |
| 2011/0314539 A1* | 12/2011 | Horton | G06F 21/35 726/20 |
| 2012/0062422 A1 | 3/2012 | Wu et al. | |
| 2012/0062427 A1* | 3/2012 | Wu | H01Q 21/205 342/450 |
| 2012/0154115 A1 | 6/2012 | Herrala | |
| 2012/0280783 A1* | 11/2012 | Gerhardt | G07C 9/00309 340/5.6 |
| 2012/0330849 A1* | 12/2012 | Nielsen | G06Q 10/06 705/301 |
| 2013/0002399 A1 | 1/2013 | Frueh | |
| 2013/0138314 A1* | 5/2013 | Viittala | B61L 15/0027 701/70 |
| 2013/0149991 A1* | 6/2013 | Hepo-Oja | G01S 1/14 455/404.2 |
| 2013/0176107 A1 | 7/2013 | Dumas et al. | |
| 2013/0237193 A1 | 9/2013 | Dumas et al. | |
| 2013/0237272 A1 | 9/2013 | Prasad | |
| 2014/0015978 A1 | 1/2014 | Smith | |
| 2014/0077929 A1* | 3/2014 | Dumas | G07C 9/00571 340/5.61 |
| 2014/0129006 A1* | 5/2014 | Chen | G05B 15/02 700/90 |
| 2014/0167912 A1 | 6/2014 | Snyder et al. | |
| 2014/0183269 A1* | 7/2014 | Glaser | G06F 21/32 235/492 |
| 2014/0197989 A1* | 7/2014 | Hepo-Oja | G01S 1/14 342/386 |
| 2014/0201537 A1 | 7/2014 | Sampas | |
| 2014/0266585 A1* | 9/2014 | Chao | G07C 9/00111 340/5.61 |
| 2015/0071274 A1 | 3/2015 | Sugar et al. | |
| 2015/0348220 A1 | 12/2015 | Sharma et al. | |

OTHER PUBLICATIONS

"EK6 Bluetooth Proximity Reader: EK6 Installation Guide." EC Key. 2 pages. Mar. 2014.
"EK6 Bluetooth Proximity Readers." EC Key, 2014. Retrieved from http://eckey.com/enterprise-access. 2 pages.
Martin, Zack. "Vodafone piloting emerging access control tech." SecureIDNews, Sep. 26, 2014. Retrieved from http://www.secureidnews.com/news-item/vodafone-piloting-emerging-access-control-tech. 2 pages.
International Search Report and Written Opinion of the International Searching Authority, mailed Oct. 28, 2015 from International Counterpart Application PCT/US2015/043455, International Filing Date Aug. 3, 2015.
International Search Report and Written Opinion of the International Searching Authority, mailed on Sep. 5, 2016, from International Application PCT/US2016/033600, filed May 20, 2016. Twelve pages.
International Search Report and Written Opinion of the International Searching Authority, mailed on Aug. 8, 2016, from International Application No. PCT/US2016/033597, filed May 20, 2016. Eleven pages.
International Preliminary Report on Patentability, mailed on Mar. 2, 2017, from International Application No. PCT/US2015/043455, filed on Aug. 3, 2015. Seven pages.

* cited by examiner

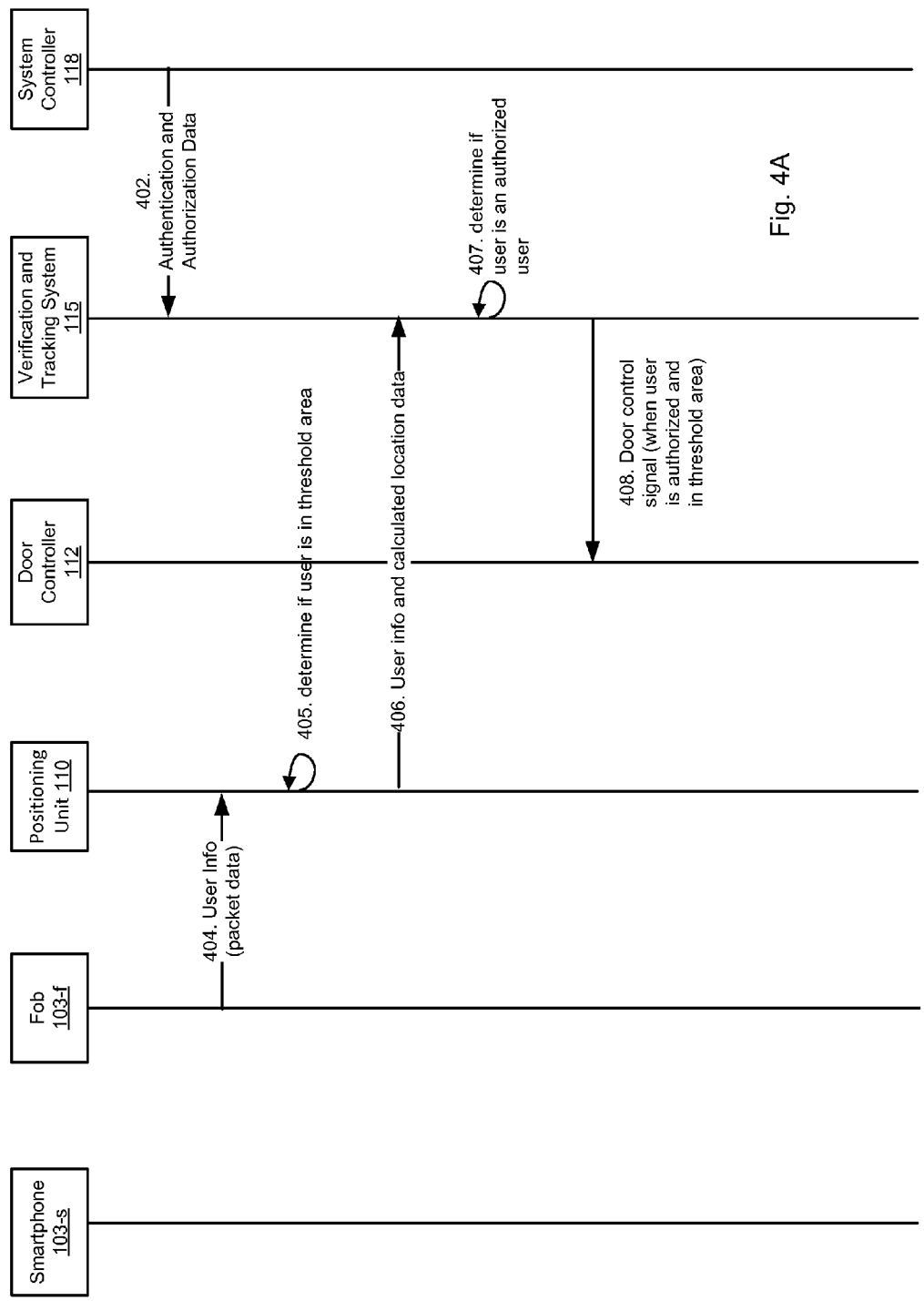

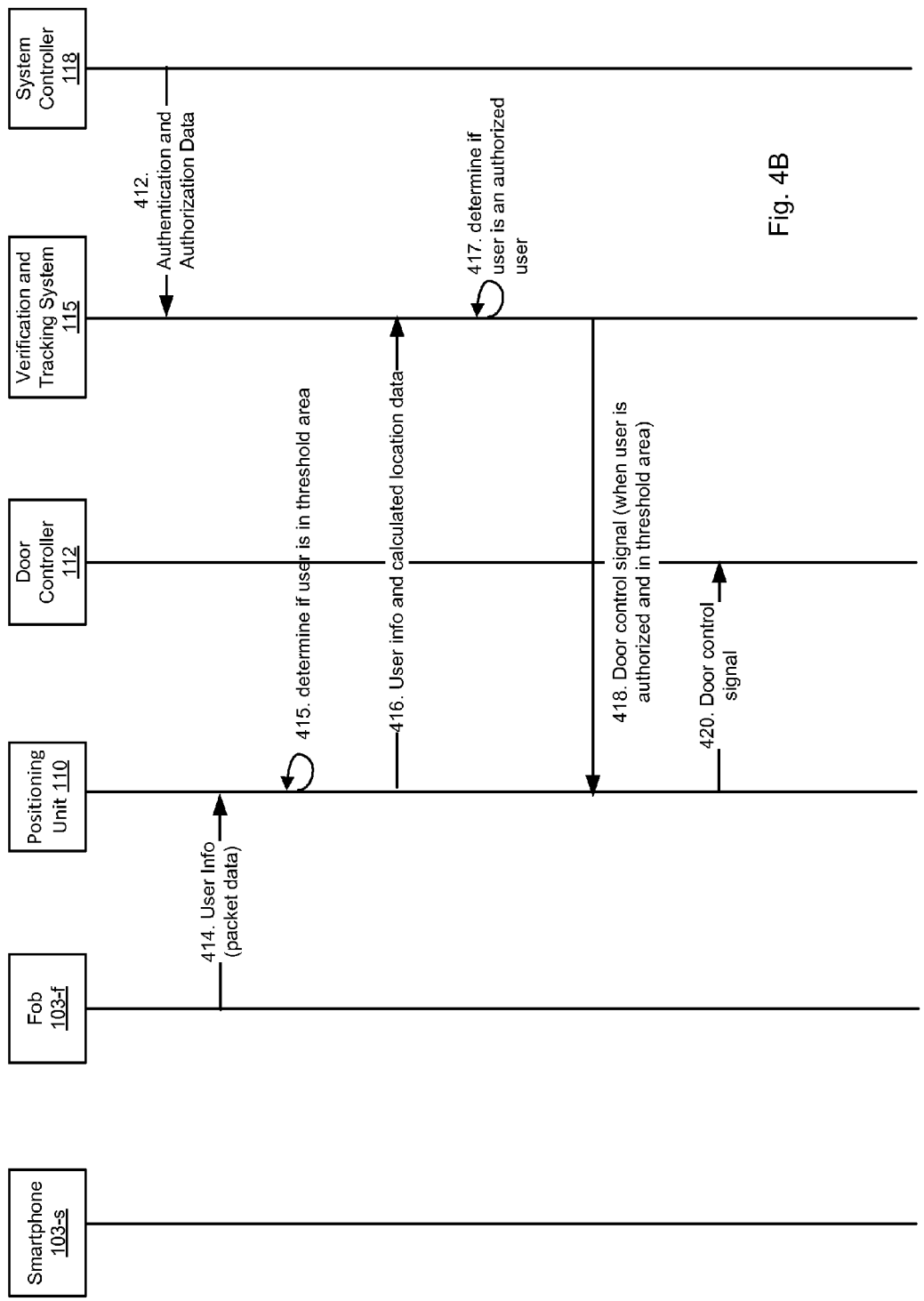

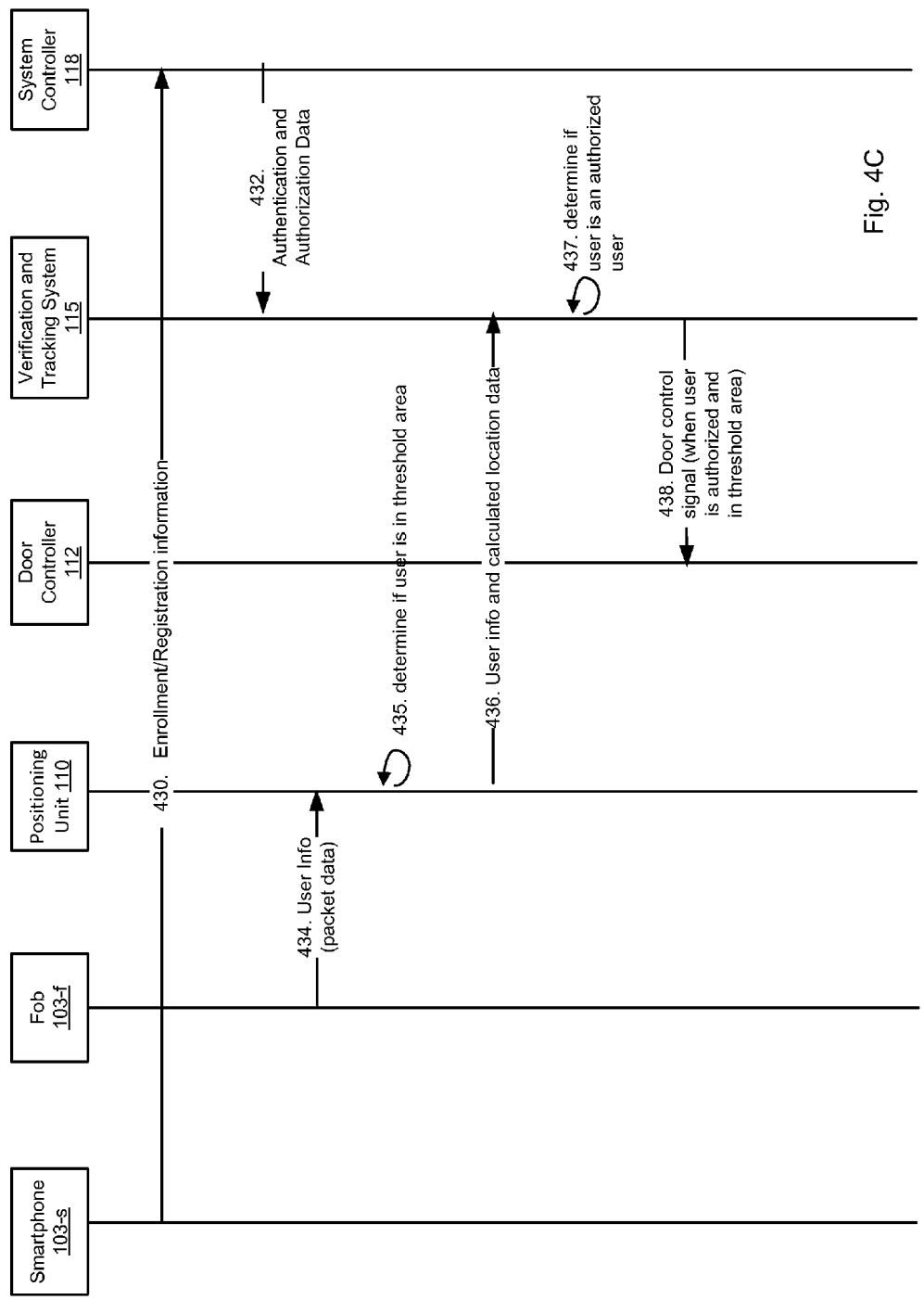

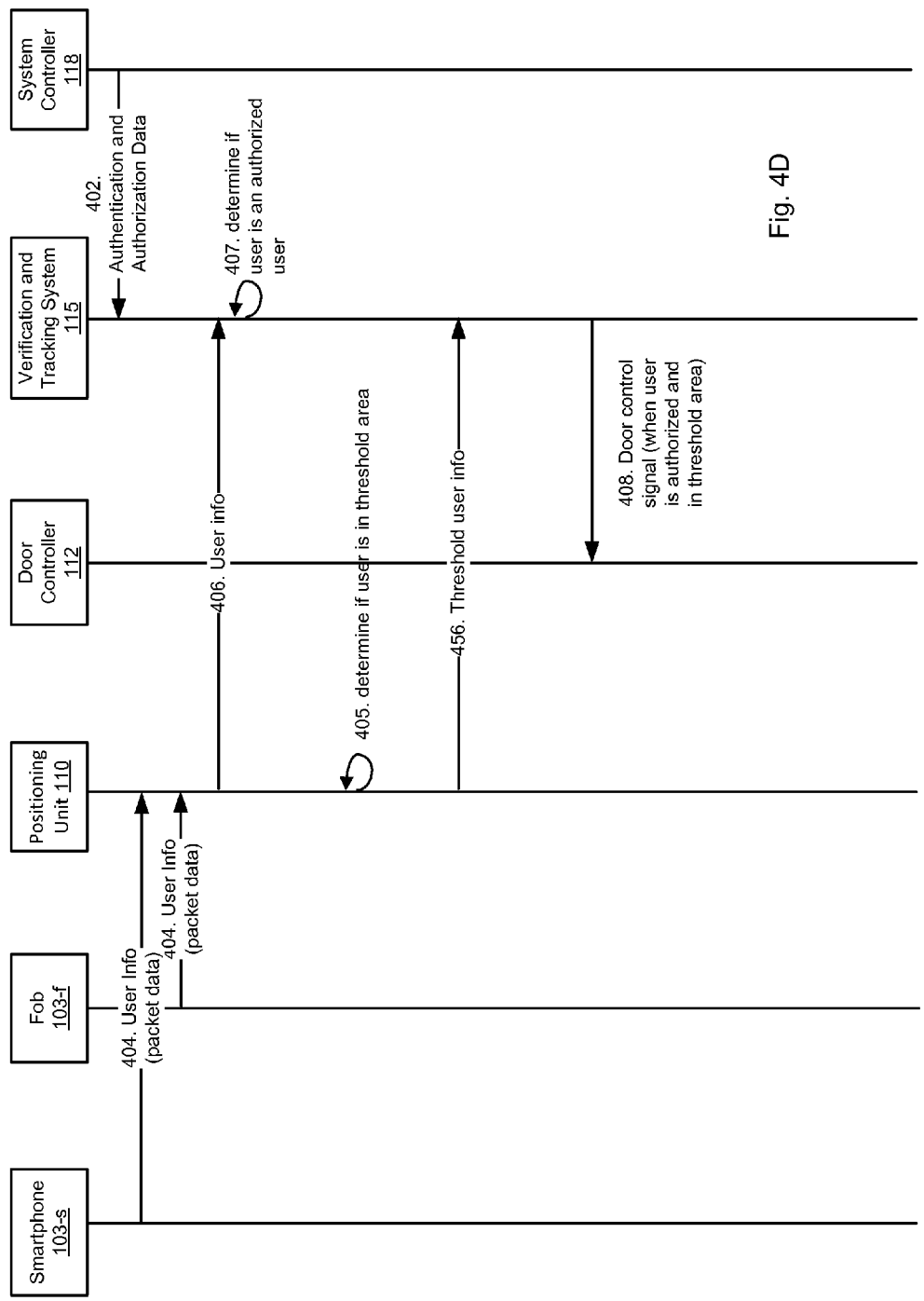

METHOD AND SYSTEM FOR ACCESS CONTROL PROXIMITY LOCATION

RELATED APPLICATIONS

This application claims the benefit under 35 USC 119(e) of U.S. Provisional Application No. 62/039,039, filed on Aug. 19, 2014, and U.S. Provisional Application No. 62/045,939, filed on Sep. 4, 2014, both of which are incorporated herein by reference in their entirety.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control readers, video surveillance cameras, network video recorders (NVRs), and door controllers, to list a few examples.

The access control readers are often installed throughout the buildings to control access to restricted areas, such as buildings or areas of the buildings. The access control readers authenticate identities of (or authorize) users and then permit those authenticated users to access the restricted areas. Typically, users interact with the access control readers by swiping keycards or bringing contactless smart cards within range (approximately 2-3 inches or 5 centimeters) of a reader. The access control readers read the information of the keycards and then the access control systems determine if the users are authorized to access the restricted areas. If the users are authorized to enter the restricted areas, then the access control readers allow access to the restricted areas by unlocking locked doors, signaling that doors should be unlocked, or not generating alarm upon unauthorized user entry, for example.

SUMMARY OF THE INVENTION

Traditional security systems using access control readers have limitations. The systems require the user to present access cards to the card reader at each access point to gain access to the restricted areas. Users typically must place their access cards such that the access cards either make direct physical contact with the access readers or are within a few inches of the access readers. This formal interaction process can be an inconvenience to the users of the system.

In contrast, the present system is directed to a frictionless access control and tracking system. A frictionless system uses wireless technology that enables a more transparent method for identifying and tracking users while providing similar access control and tracking as traditional systems and methods. The present system can automatically identify and track users and enable access to restricted areas when authorized users are approaching or in threshold areas of the entrances to the restricted areas. Threshold areas are typically areas within close proximity to the entrances of the restricted areas, such as an area near a locked door, in one example. The present system accomplishes these tasks without requiring the users to swipe or wave keycards, for example, at card readers to more continuously track those users in and around buildings.

In the present system, users carry an active wireless device on their person that transmits their credentials to a wireless receiving device, or positioning unit. The active wireless user devices include electronic devices such as key fobs (or fobs) or mobile computing devices such as smart phones or tablet computing devices. These user devices broadcast user information in data packets, also known as packet data. The packet data includes user credentials and a unique ID for each of the user devices and/or user. The packet data are received by positioning units. The positioning units preferably include two or more antennas.

The positioning units can then determine locations of the user devices (and thus the locations of the users) by using various positioning techniques of the antennas. The positioning units then convert the locations of the users into location data.

The positioning units send the packet data and the location data to a verification and tracking system, which authenticates the users. Additionally, the verification and tracking system sends signals to door controllers to unlock the doors and to allow access to restricted areas when the positioning units determine that user devices (and thus the users) are in the immediate vicinity of/close proximity to the door or other access point.

Additionally, the system is able to detect on which side of the door the user is located and his/her physical presence within close proximity of the door. Typically, the system determines user proximity to a door when two conditions are satisfied. First, the user must be located within a threshold area of the door, which is typically an area within two feet or less from the door handle. Second, the user must be stationary at the door for a minimum time period and not moving past the door.

The present system provides additional advantages over traditional systems and methods. In one example, the location information can be used in conjunction with video data from video cameras to verify identities of the users carrying the fobs and track any other individuals. The video cameras are especially useful at detecting "tailgating" by non-authorized users. Tailgating is when non-authorized users attempt to access a restricted area, accidentally or intentionally, by following authorized users into the restricted areas after authorized users have been authenticated and access granted.

Another advantage is the ability to initiate a "smart" lockdown in response to emergency situations (e.g., a fire, a prison riot, or a missing child/person in a store or building). In response to an emergency situation being initiated, an emergency lockdown signal is sent from a system controller to the verification and tracking system, which forwards the signal to the door controllers. This causes door controllers to unlock and grant or lock and deny access/movement according to the type of situation. If the specific location of the threat is known, the system can employ the user tracking information so that some doors may be strategically unlocked to enable users to evacuate to safety while confining the threat to a specific location. During a lockdown, the security system may implement "super user" fobs for specific personnel (e.g., security, law enforcement, first responders, firefighter, etc.) to enable only those people with the "super user" fobs to move through all areas of the building to neutralize the threat and/or treat and evacuate users.

In general, according to one aspect, the invention features a security system comprising user devices that transmit wireless signals including packet data, wherein the packet includes user information. Access points provide access to restricted areas and positioning units are located near the access points that include two or more antennas. Each of the positioning units receive the wireless signals from the user devices, and determine locations of the user devices relative to the access points using the antennas.

In an embodiment, the antennas of the positioning units are Bluetooth Low Energy (BLE) antennas in which a first antenna of the positioning units is an omnidirectional antenna and a second antenna of the positioning units is a directional antenna. The positioning units determine the locations of the user devices relative to the access points by comparing attenuation of the wireless signals received between the two or more antennas.

In one case, the directional antenna is created by using a grounded enclosure housing a second omnidirectional antenna to form a directional antenna. In other examples, the directional antenna is a horn antenna or a flat-panel antenna or a phased-array antenna.

In operation, a verification and tracking system sends the signals to the door controllers to unlock the access points in response to the verification and tracking system determining that the user devices are authorized and in response to the positioning units determining that the user devices are located within a threshold area of the access points and remain within the threshold area for at least a lingering threshold value.

In a typical implementation, the user devices include mobile phones and/or fobs.

Further video cameras that capture video data of users carrying the user devices can also be employed. A video analysis system then determines identities of the users carrying the user devices from the video data.

In general, according to another aspect, the invention features a method for tracking and authorizing user devices in a security system. The method comprises the user devices transmitting wireless signals including packet data. The packet data will usually include user information. The wireless signals are received from the user devices via positioning units including two or more antennas and the positioning units determine locations of the user devices relative to access points. Access is then provided to restricted areas via the access points based on the determined locations.

In general, according to still another aspect, the invention features a positioning unit for monitoring wireless user devices relative to an access point of a building. This positioning unit comprises an omnidirectional antenna that detects BLE signals from the wireless user device and a directional antenna that is used to determine whether the user devices are located within a threshold area of the access point and also remain within the threshold area for at least a lingering threshold value.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4A-4D are sequence diagrams for four exemplary implementations of the security system, where the sequence diagrams illustrate the interactions between a mobile active wireless user device (e.g., a smartphone or fob), the positioning unit, a door controller, a verification and tracking system, and a system controller of each implementation;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
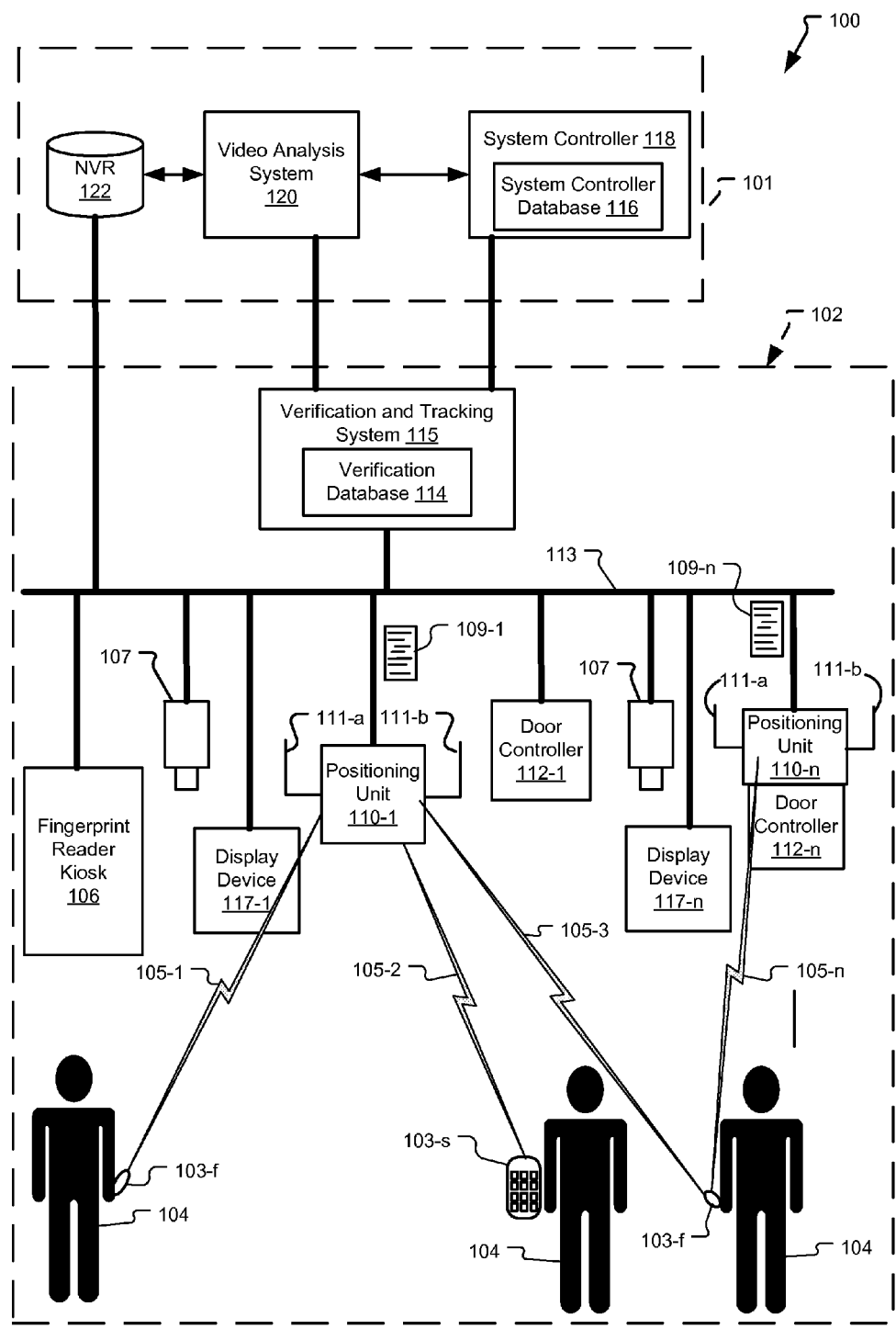
FIG. 1 is a block diagram of a security system that identifies users, tracks locations of active wireless devices, and controls access to restricted areas.

FIG. 1 is a block diagram of an exemplary security system 100 that identifies users 104, tracks locations of user devices 103 such as fobs and smart phones or other mobile computing devices, and enables access to restricted areas of a building 102. In the example, the security system 100 is distributed between two or multiple locations or buildings 102. The system also includes backend components such as a system controller 118, a video analysis system 120, and a network video recorder 122 that are typically located in a security control room 101 or other secure location of the building 102. Alternatively, one or more of these components could be part of a cloud-based network, or "cloud."

The system 100 also includes a verification and tracking system 115, and positioning units 110, and may further include additional components such as video cameras 107, a fingerprint reader kiosk 106, display devices 117, and door controllers 112. These devices are usually located within the building 102 that is being protected and/or secured by the security system 100.

In a typical implementation, users 104 carry user devices 103 (e.g., fobs, smartphones, tablets, phablets, or other mobile computing devices), which broadcast user information as packet data 105-1 to 105-n with unique IDs. The packet data 105 is secured to prevent unauthorized third parties from intercepting and viewing the broadcast data. In one example, the packet data 105 is encrypted. In a preferred embodiment, the user devices 103 broadcast using BLE (Bluetooth low energy) technology.

In yet another example, a rolling security identification (id) is used within the fob/user device. A rolling security id typically generates an authentication code associated with each individual at fixed intervals. The code includes a random key or "seed" that is different for each fob/user device 103.

Bluetooth is a wireless technology that operates in a 2.4 GHz (gigahertz) short-range radio frequency band. In free space, Bluetooth applications typically locate a Bluetooth device by calculating the distance of the user devices 103 from the signal receivers. The distance of the device from the receiver is closely related to the strength of the signal received from the device. A lower power version of standard Bluetooth called Bluetooth Low Energy (BLE), in contrast, consumes between ½ and 1/100 the power of classic Bluetooth. BLE is optimized for devices requiring maximum battery life instead of higher data transfer rates associated with classic Bluetooth. BLE has a typical broadcast range of about 100-150 feet (approximately 35-46 meters).

In an alternative implementation, the user devices 103 are capable of broadcasting via standard Bluetooth. In still other alternative implementations, the user devices 103 may broadcast via other wireless technologies such as Wi-Fi (IEEE 802.11), active RFID (radio frequency identification), or ZigBee, to list a few examples.

The positioning units 110 each preferably include two or more antennas 111. The packet data 105 are received by antennas 111-a, 111-b of one or more positioning units 110-1 to 110-n, which are located throughout the building 102. The positioning units 110-1 to 110-n determine locations of the users 104 using one or more positioning techniques.

A preferred positioning technique compares signal attenuation between two antennas 111 of the positioning unit 110. Another positioning technique includes determining time of flight of packet data 105 received at each of the antennas 111 of a positioning unit 110. In yet another positioning technique example, the positioning units 110 employ triangulation between two or more positioning units 110 installed within the building. The positioning units 110 then provide the locations of the users 104 as location data 109.

The user information (i.e., the received packet data 105) and the location data 109 are sent from the positioning units 110-1 to 110-n to the verification and tracking system 115 via a data network 113. Typically, the data network 113 is a Local Area Network (LAN) such as wired or wireless Ethernet. The positioning units 110-1 to 110-n can also communicate with the verification and tracking system 115 via serial connections, in another example.

As the users 104 and their user devices 103 move through the building 102, the tracking of the user devices 103 and therefore of the users 104 is often "handed off" to other positioning units 110 in order to reduce or eliminate tracking blind spots within the building 102.

The verification and tracking system 115 accesses authorization information in the verification database 114 to determine which users 104 are authorized to access specified restricted areas of a building 102. Once the users 104 are authenticated by the verification and tracking system 115, the verification and tracking system 115 sends a door control signal via the network 113 to the door controller 112-1. The door controller 112-1 then enables access to a restricted area by unlocking an access point of the restricted area, such as a door or portal, suppressing the generation of an alarm. The door controller 112-1 preferably unlocks the door when the user 104 is within a threshold area near the access point (e.g., the door or other portal) of the restricted area.

The door controllers 112-n can also be directly coupled to the positioning units 110-n. In this implementation, the verification and tracking system 115 sends door control signals via the network 113 to the positioning units 110-n, which in turn activate their door controllers 112-n to enable access to the restricted areas.

In a typical implementation, the security system 100 includes the system controller 118, which includes a system controller database 116. In general, the system controller database might store various user information such as name, department, work extension, personal phone numbers, email addresses, and ID number. The controller database 116 also stores authorization information (e.g., which users are permitted to access which restricted areas). Periodically, the system controller 118 sends updated user information and authorization information to the verification and tracking system 115 via the network 113.

In the exemplary security system 100, the video cameras 107 record video data, which are sent via the network 113 to the network video recorder 122 to store the video data. Typically, time and date information are added to video data to enable the data to be indexed and reviewed at a later date. This information is also known as video metadata. The video analysis system analyzes video data and may associate metadata to moving objects (e.g., people), numbers of moving objects, and specific users, to list a few examples.

The video analysis system 120 typically combines the tracking information generated by the tracking and verification system 115 with the video data from the video cameras 107. In one example, facial recognition information determined from the video data is used to confirm that the individuals possessing the user devices 103 are the proper users. In other examples, the tracking information is combined with the video data to determine which persons in a scene are users (holding users devices) and which are non-users.

Typical embodiments of the security system 100 include display devices 117-1 to 117-*n*. These display devices could be screens of access control readers or standalone display devices (e.g., LCD screen), for example. In one embodiment, the display devices 117-1 to 117-*n* are wirelessly connected to the network 113. In an alternative embodiment, the display devices 117-1 to 117-*n* are connected via wired connections and receive power via PoE (power of Ethernet).

The display devices 117-1 to 117-*n*, if used, display messages to the users such as "access granted", "access denied", warnings about low power of the user devices 103 or warnings about emergency situations, in examples. Additionally, personalized messages may be directed towards specific users regarding personal and/or work matters. For example, a message could be generated by a supervisor attempting to locate an employee. In another example, a message could be generated indicating that a family member and/or relative of the user are attempting to contact the user. These messages can be efficiently targeted at the intended recipient since the user location information is known and thus it is known when they are in front of a display device, for example.

A fingerprint reader kiosk 106 may also be deployed in some embodiments of the security system 100. In some high-security situations, users are required to periodically return to the fingerprint reader kiosk 106 and scan their fingerprint(s) to re-authenticate with the security system. This process helps ensure that the user in possession of the fob or other user device is also the registered owner of the fob 103.

While not shown in the illustrated figures, fingerprint scanners may be implemented in the fobs or mobile computing devices 103, in still other examples. In this scenario, the users would not have to periodically return to the fingerprint reader kiosk 106. Rather, the users would periodically authenticate themselves via the fingerprint reader integrated into the fobs or mobile computing devices 103.

Figure 2A:
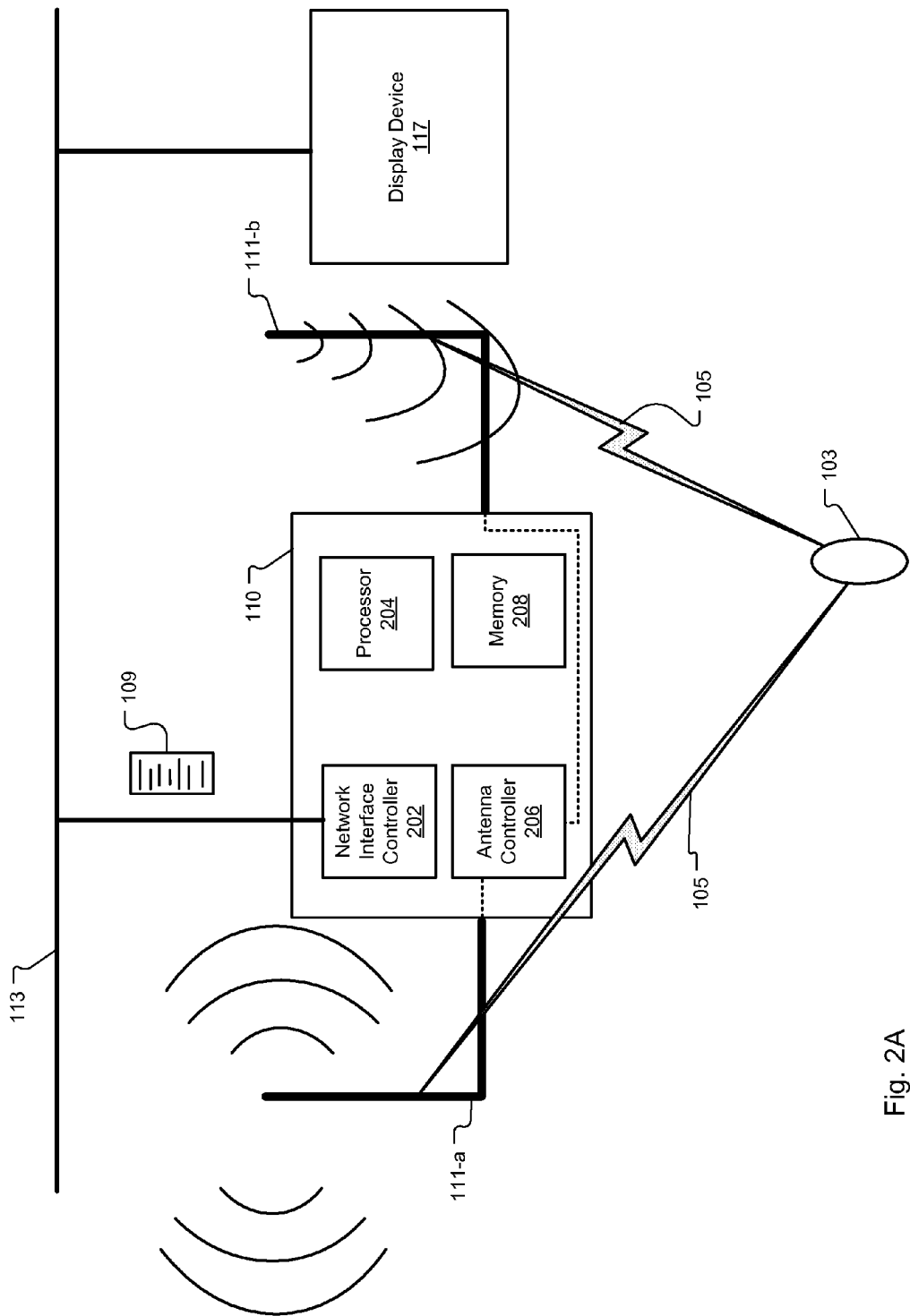
FIG. 2A is a block diagram illustrating a preferred embodiment of a positioning unit that includes one omnidirectional antenna and one directional antenna for determining a location of an active wireless device such as a fob or mobile computing device.

FIG. 2A is a block diagram illustrating a preferred embodiment of the positioning unit 110, which includes two antennas 111-*a*, 111-*b* (e.g., one omnidirectional antenna and one directional antenna) for determining a location of a fob or other user device 103-*f* or mobile computing device (e.g., a smartphone 103-*s*). Preferably, Bluetooth Low Energy (BLE) is the wireless technology used for communications between the user devices 103 and the positioning units 110.

In a BLE-enabled system, users carry an active BLE device on their person that transmits their credentials to one or more BLE-enabled positioning units located in different places throughout a building. However, the characteristics of Bluetooth signals can present challenges when determining the location of an individual relative to entry and exit points of a building 102. This especially impacts BLE because of its lower power and therefore more limited distance range as compared to standard Bluetooth signals.

When BLE receivers such as positioning units 110 are installed in buildings 102, objects and obstructions such as walls and furniture located in the vicinity of the access points can adversely affect the reception of Bluetooth signals. This is because the objects absorb, reflect and refract radio waves in different ways and in different amounts. As a result, Bluetooth signals can scatter to the point of becoming directionless. This can severely limit the distance-signal strength relationship between the user devices 103 and the positioning units 110 and therefore the ability of the positioning units 110 to locate the user devices 103.

To solve this problem, the positioning system 110 includes two antennas 111-*a* and 111-*b* for determining the location of a fob 103-*f* or mobile computing device (e.g., a smartphone 103-*s*) as the user devices 103. In one example, the first antenna 111-*a* and the second antenna 111-*b* are both BLE antennas. In the preferred embodiment, the first antenna 111-*a* is an omnidirectional antenna 137 and the second antenna 111-*b* is a directional antenna. The antennas 111 detect packet data 105 broadcast by user devices 103 such as fobs and/or smartphones, which are carried by the users or are located on their person. Typically, the directional BLE antenna 111-*b* establishes the close proximity of a user to an access point such as a door, and the omnidirectional BLE antenna 111-*a* allows the system to continuously monitor the location of the users.

Using positioning techniques (e.g., time of flight to each antenna, triangulation with other positioning units, and/or signal attenuation calculations), the positioning unit 110 is able to determine the location of the fob or mobile computing devices 103. Additionally, the use of an omnidirectional antenna 111-*a* and a directional antenna 111-*b* enable finer granularity in the location calculations since the directional antenna can be used to generate finer location information within a specific region such as a door threshold.

In the illustrated example, the positioning unit 110 includes a network interface controller 202, a processor 204, an antenna controller 206, and memory 208. The network interface controller 202 provides an interface with the network 113. This enables the positioning unit 110 to communicate with the verification and tracking system 115 and the door controllers 112-1 to 112-*n*.

Figure 2B:
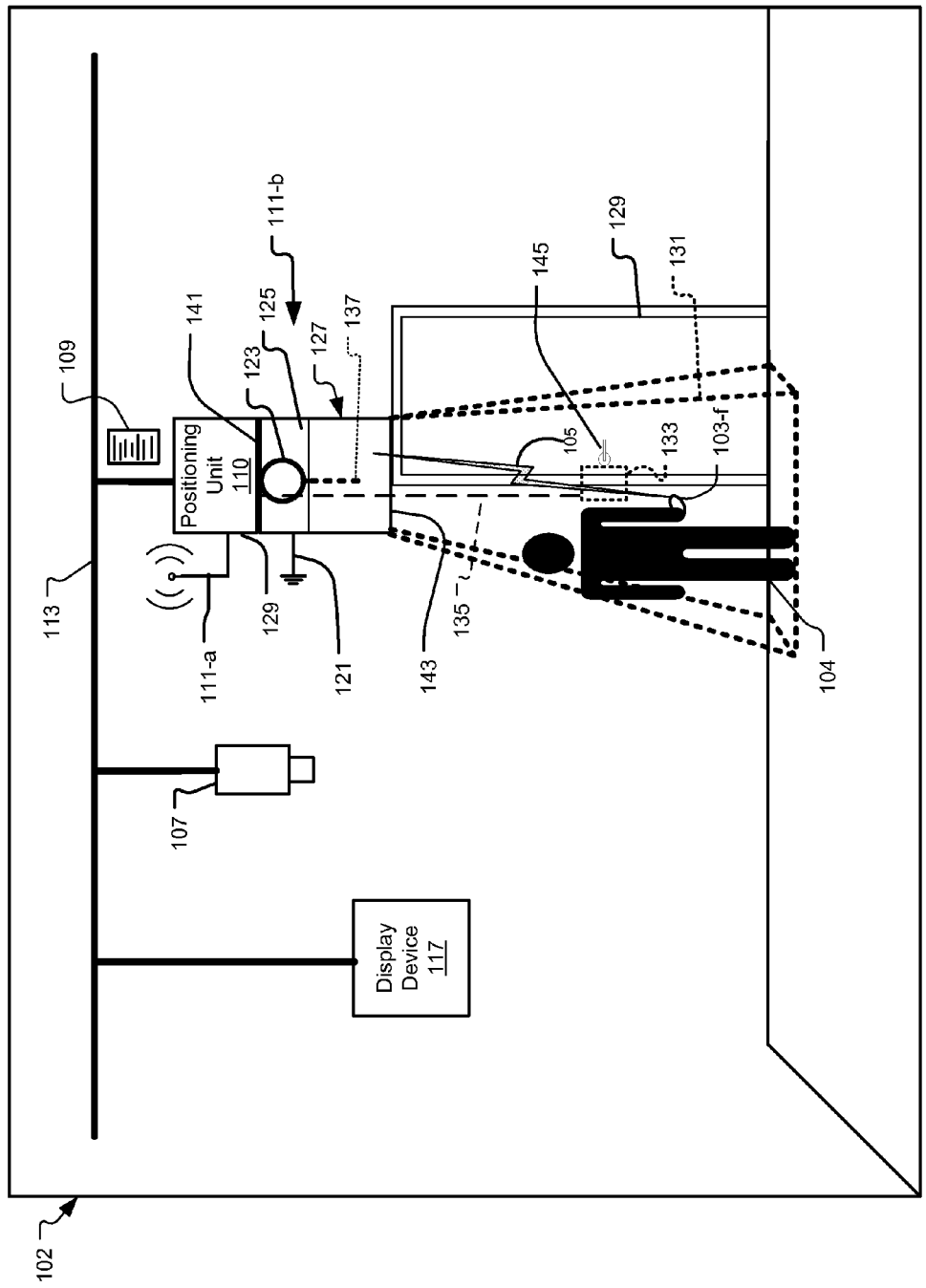
FIG. 2B is a block diagram illustrating an embodiment the positioning unit with an omnidirectional antenna that is housed within an enclosure to create a directional antenna.

FIG. 2B is a block diagram illustrating another embodiment of the positioning unit 110 that also includes an omnidirectional antenna 111-*a* and a directional antenna 111-*b*. The directional antenna 111-*b* comprises an omnidirectional 137 that is housed within an enclosure 127 to form the directional antenna 111-*b*. The directional antenna 111-*b* is preferably oriented towards a door striker 133 of a door 129 access point. The door striker 133 is typically integrated with or located adjacent to a door handle 145 of the door 129.

In the illustrated example, the positioning unit 110 includes the omnidirectional antenna 111-*a* mounted to the exterior 129 of the positioning unit 110 to continuously monitor the locations of users. Additionally, a door striker 133 is electrically coupled to the positioning unit 110 via a connection (e.g., universal serial bus) 135, which is typically installed within the walls of the building 102.

The directional antenna 111-*b* is created by housing the omnidirectional antenna 137 within a grounded (e.g., ref. numeral 121) partial Faraday enclosure (enclosure) 127 of the positioning unit 110 to create directionality. In one example, the enclosure 127 is fabricated from aluminum, but other conductive materials known in the art could also be used. In a typical implementation, the enclosure 127 includes copper shielding (e.g., copper mesh) 125. Preferably, the shielding and enclosure are designed to shield the antenna 137 from 2.4 GHz signals arriving from the front, back, top, and sides of the enclosure 127.

A bottom 143 of the enclosure 127 is left open to create an aperture and allows the entrance of wireless signals such as 2.4 GHz Bluetooth signals. The waves travel up from the bottom 143 of the enclosure 127 towards the second omnidirectional antenna 137, which is preferably mounted at a top 141 of the enclosure 127. Typically, the length of the enclosure 127 is adjustable based on the required/desired angle of incidence for the threshold area 131 near the locked door 129.

In a current embodiment, the enclosure 127 is approximately 5 inches wide and 7 inches long (13 centimeters by 18 centimeters) or less and 2 inches (5 centimeters) in depth, or less. Preferably, these dimensions create an adaptive waveguide for 2.4 GHz Bluetooth signals. In alternative embodiments, the dimensions (e.g., length, width, depth) of the enclosure 127 and the shape of the aperture (e.g., opening) of the enclosure may be altered depending on the required/desired angle of incidence for the threshold area 131. Additionally, the dimensions may also be adjusted depending on a desired operating frequency of the wireless technology of the second antenna 111-b.

In yet another alternative embodiment, the enclosure 127 is fabricated with extendable and/or collapsible walls and/or hinged sections (not shown) to allow the aperture to be adjusted, typically at the time of installation.

Generally, a cross-section of the enclosure 127 is designed to allow the passing of a 2.4 GHz wave from the bottom of the enclosure 127 to the antenna 137 and receiver (e.g., Bluetooth receiver), which is installed within the enclosure and mounted to the top wall of the enclosure. Typically, the Faraday enclosure 127 does not completely block radio waves from the sides and top of the enclosure. The waves from the sides and top of the enclosure 127 are only partially attenuated. In one embodiment, the enclosure and antenna 137 are attached to a gimbal 123, which allows for precise adjustment of the directionality of the antenna and thus the threshold area 131.

In a typical implementation, the threshold area 131 is approximately 3 feet (or approximately 1 meter) deep (e.g., distance out from the door) and includes a width of that typically ranges between 3-6 feet (e.g., 1-2 meters). Additionally, the threshold area 131 is generally installed off-center from the door 129 to account for an opening and closing arc of the door 129, often being centered on the door handle 145.

In a preferred embodiment, the positioning unit 110 accounts for signals that are reflected off of surfaces and objects (e.g., walls, furniture, people) as well as signals from devices on different floors and/or behind the door 129, which leads to the restricted area. The positioning unit 110 must account for signals coming from other areas of the building 102 because the signals in the 2.4 GHz band are able to travel through walls and floors. Moreover, the positioning unit 110 must also ensure that the door striker 133 is not accidentally unlocked due to an authorized user walking on a different floor.

Figure 2C:
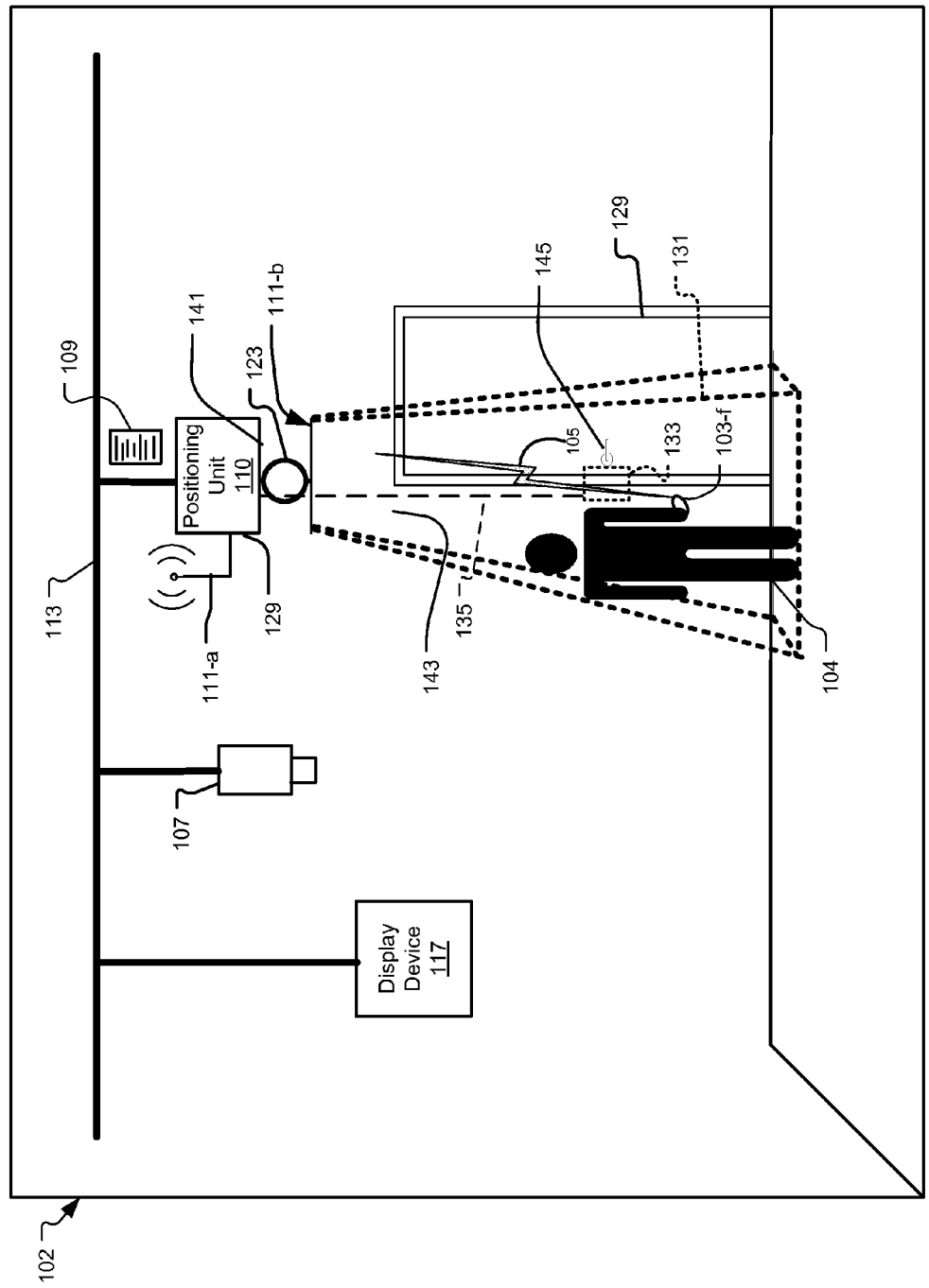
FIG. 2C is a block diagram illustrating an embodiment the positioning unit with directional antenna such as a flat panel or horn antenna.

FIG. 2C is a block diagram illustrating another embodiment of the positioning unit 110. Instead of using an omnidirectional antenna within an enclosure to form the directional antenna 111-b. Native directional antenna technology is used.

In one example, the directional antenna 111-b is a horn antenna. Generally, horn antennas include a waveguide to collect radio waves from a given direction, characterized by horizontal and vertical beam widths, for reception and detection.

In another example, the directional antenna 111-b is a flat panel antenna or a phase-array antenna. These are directional antennas that can be flush mounted in the wall or ceiling.

Figure 3:
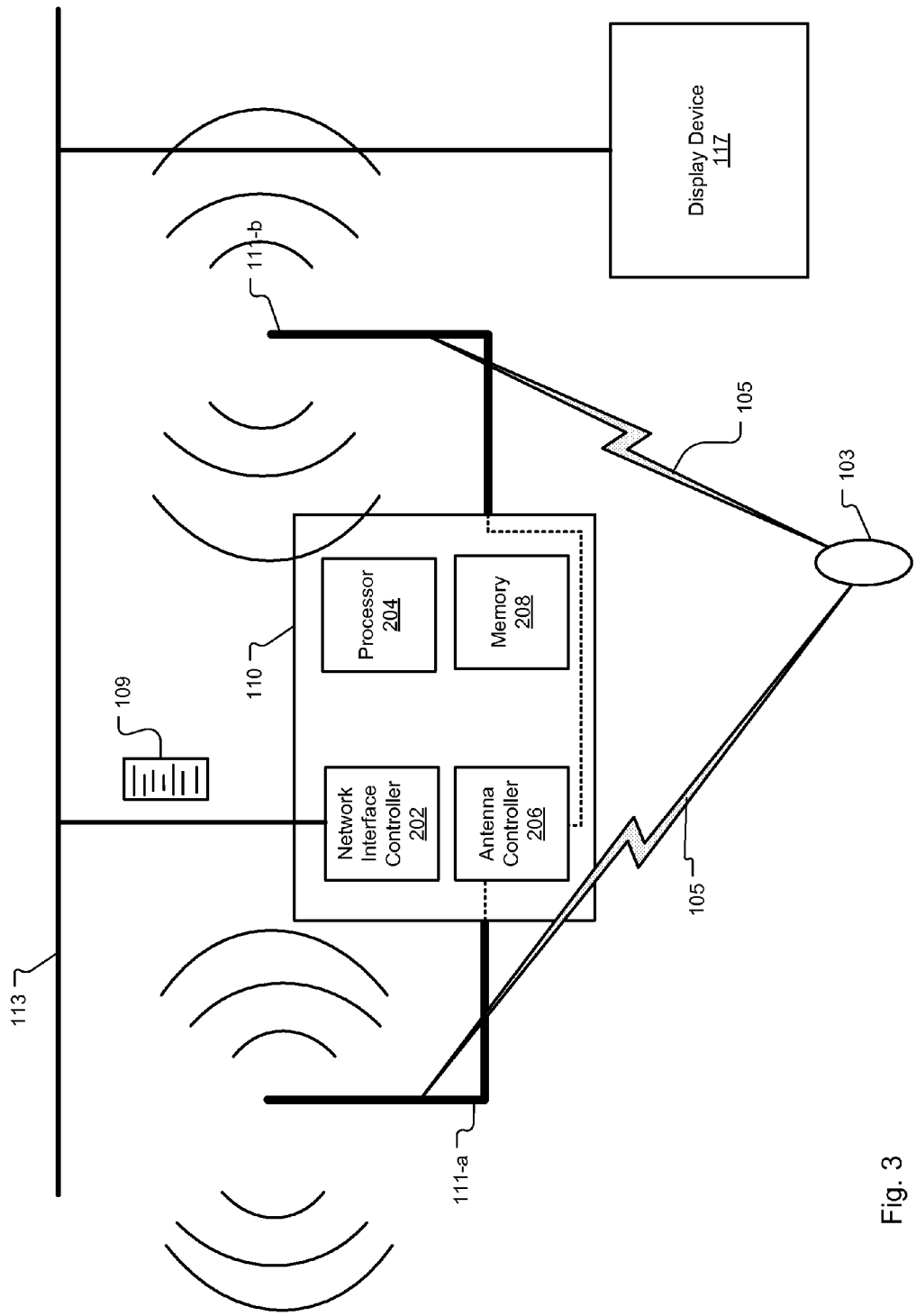
FIG. 3 is block diagram illustrating an alternative embodiment of the positioning unit, which includes two omnidirectional antennas.

FIG. 3 is block diagram illustrating an alternative embodiment of the positioning unit 110. In this embodiment, the positioning unit 110 includes two omnidirectional antennas. This embodiment uses triangulation based on the time of receipt of signals from the user device 103 to determine the range of the user device 103 from the positioning unit.

FIG. 4A-4C are sequence diagrams for interactions between components for three different implementations of the security system 100.

FIG. 4A shows component interactions for a first exemplary implementation of the security system 100. First, in step 402, user information and authentication information are sent from the system controller 118 to the verification and tracking system 115 via the network 113. The system controller 118 periodically updates the verification and tracking system 115 at regular intervals (e.g., daily, weekly). Locally storing the authentication information at the verification and tracking system 115 enables faster operation and allows the system to continue to function if communications are lost with the system controller 118.

In step 404, the fob 103-f broadcasts user information, which is detected by the positioning unit 110. Additionally, the positioning unit 110 also calculates the location of the fob, and determines if the fob (and therefore if the user) is in the threshold area 131, in step 405. The user information 105 and the location data 109 are then sent to the verification and tracking system 115 for authentication in step 406.

In step 407, the verification and tracking system 115 determines if the user is as authorized user. In step 408, if the user is an authorized user, and the user's fob was also determined to be within a threshold area, then the verification and tracking system 115 sends a door control signal to the door controller 112 to enable access to the restricted area (e.g., unlock the door). In the event that there are multiple authorized users also within close proximity of the door, then the door controller 112 keeps the door unlocked until all users have entered the restricted area.

Additionally, while not illustrated in the figure, the verification and tracking system 115 may also send "Access granted" messages to be displayed on display devices 117 to provide visual indications to the users in some examples.

FIG. 4B shows major component interactions for a second exemplary implementation of the security system 100. Steps 412, 414, 415, 416, and 417 operate in a similar fashion as in steps 402, 404, 405, 406, and 407, respectively, of the first implementation in FIG. 4A.

In step 418, if the user is an authorized user, and the user's fob was also determined to be within a threshold area of the restricted area, then the verification and tracking system 115 sends a door control signal to the positioning unit 110. The positioning unit 110 then forwards the door control signal to the door controller 112 in step 420.

FIG. 4C shows component interactions for a third exemplary implementation of the security system 100. Instead of a fob user device 103, as in FIG. 4A and FIG. 4B, a smartphone user device 103 is carried by the user 104 on their person. In examples, the smartphone user device 103 can have integrated BLE capability, or include an external BLE-enabled device such as a BLE dongle that plugs into a USB port of the smartphone user device 103, in examples.

In step 420, typically via an application running on their smartphone user device 103, the user first enrolls and/or registers with the system controller 118 prior to interaction with the security system 100. The remaining steps 432, 434, 435, 436, 437, and 438 for identifying and authorizing users, tracking their locations, and providing access to the restricted areas are analogous to steps 402, 404, 405, 406, 407, and 408, respectively, of the first implementation in FIG. 4A.

FIG. 4D shows component interactions for a fourth exemplary implementation of the security system 100.

One problem that can arise relates to the response time of the system. Generally, the door controller should grant or deny access within 250 milliseconds to authorized users. The process of detecting the smartphone mobile computing device and/or fob combined with the determining whether the user is authorized, or not, consumes response time.

To address this issue, a pre-qualification process is used in some implementations. User information is received from mobile computing device users and fob users in steps 404. This information is obtained for all users that are within the range of the positioning unit 110. With some technologies, this process will include all users within possibly 80 feet (25 meters). In other examples, signal strength is used to limit the pre-qualification to only a limited number of users such as users that are approaching the door or other access region, e.g., users that are within 30 feet or 10 meter range and/or have devices that have a received signal strength of greater than a threshold power level as detected by the positioning unit 110.

The user information 105 for these near or approaching users is then sent to the verification and tracking system 115 for authentication in step 406. In step 407, the verification and tracking system 115 determines if the users are authorized users, or not. If required, the verification and tracking system 115 may confirm user status and credentials with the system controller 118 if the users' information has not been previously sent to the verification and tracking system and/or the information is stale.

Additionally, the positioning unit 110 also calculates the location of the fob or mobile computing devices, and determines if the fob or device (and therefore if the user) is in the threshold area 131, in step 405. For users that are determined to be at the door or access region threshold, the user information for these users within the threshold are sent to the verification and tracking system in step 456. Due to the pre-qualification process, in most cases, the verification and tracking system will already know the users' status and thus signals the door controller 112 to grant access or not in step 408 with a very low latency.

Figure 5A:
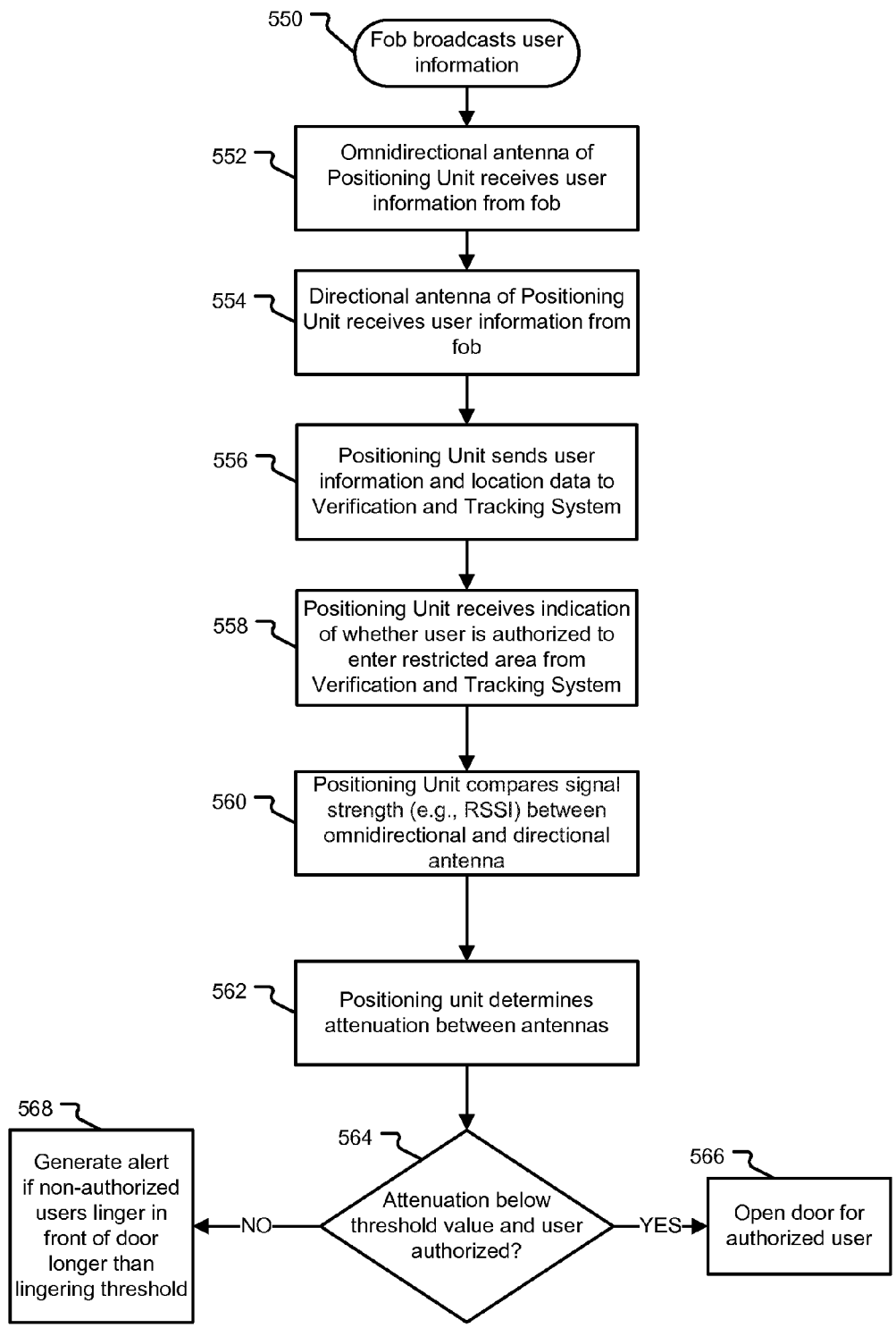
FIG. 5A is a flowchart illustrating how the positioning unit determines the location of a user based on the signal characteristics of a mobile active wireless user device.

FIG. 5A is a flowchart illustrating how the positioning unit 110 determines the location of a user based on the signal characteristics of the mobile broadcasting user device 103.

In a typical implementation, the positioning unit 110 determines if the origin of the signal (e.g., the fob 103-*f* currently broadcasting its user information) is directly beneath the positioning unit 110 and enclosure 127. This is accomplished by comparing the signal strength of the two antennas (i.e., the omnidirectional antenna and the directional antenna). By comparing the attenuation between the two antennas 111-*a*, 111-*b*, the positioning unit 110 determines if the user and thus the user devices are in close proximity to the door 129 (i.e., in the threshold area).

In the first step 550, the user device (e.g., fob mobile user device) broadcasts user information. Next, the omnidirectional antenna 111-*a* of the positioning unit 110 receives user information from the fob in step 552. The directional antenna 111-*b* of the positioning unit 110 also receives user information from the fob in step 554.

The positioning unit 110 sends the user information 105 and location data 109 to the verification and tracking system 115 in step 556. In the next step 558, the positioning unit 110 receives an indication of whether the user is authorized to enter the restricted area from the verification and tracking system 115.

In the next step 560, the positioning unit 110 compares the signal strength between the omnidirectional 111-*a* antenna and the directional antenna 111-*b*. Next, the positioning unit 110 determines the attenuation between the antennas in step 562.

In step 564, the positioning unit 110 determines if the attenuation is below a threshold value and whether the user was authorized by the verification and tracking system 115. In general, as the fob moves toward the threshold area in front of door, the attenuation approaches zero. Once the attenuation reaches zero (or the threshold value), then the fob (and user) are determined to be within the threshold area in front of the door.

If the attenuation is below the threshold value and the user is authorized by the verification and tracking system 115, then the positioning unit 110 sends a signal to the door controller to unlock the door for the authorized user in step 566.

If the attenuation is not below a threshold value and/or the user is not authorized by the verification and tracking system 115, then the positioning unit 110 generates an alert if the non-authorized user lingers in front of the door for longer than a predefined lingering threshold value. A typical lingering threshold value is 5 seconds. Sometimes this threshold value is more and in some cases a lower value is used.

According to another implementation, the verification and tracking system 115 can "pre-qualify" user credentials for users.

Figure 5B:
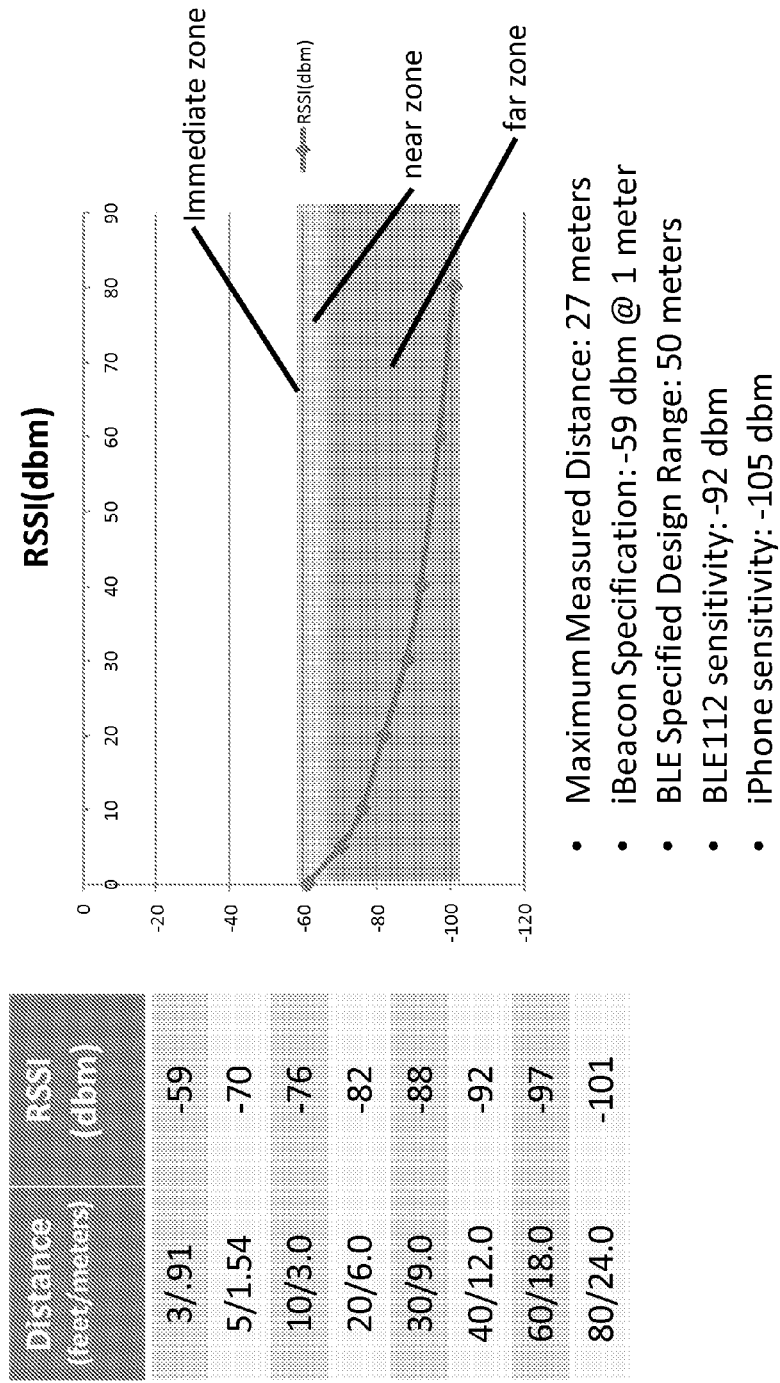
FIG. 5B is a received signal strength indication (RSSI) vs. distance graph for an exemplary BLE user device communicating with a positioning unit, according to principles of the present invention.

FIG. 5B is a graph of received signal strength indication (RSSI) in Decibel-milliwatts (or dbm) as a function of distance, for iBeacon and BLE112 hardware implementations of BLE. The graph plots the RSSI for both BLE112 and iBeacon-equipped iPhone user devices 103 communicating with a positioning unit 110 according to principles of the present invention. The distance is measured in feet. iPhone and iBeacon are registered trademarks of Apple, Inc.

The graph includes three zones. The first zone is the immediate zone. This zone typically encompasses to the threshold area and has a range of 0 to 3 feet from the door (or approximately 0 to 1 meter). Generally, very accurate position information is obtained in this zone. The second zone is the near zone. The range of this zone is approximately 7 to 10 feet (or 1 to 3 meters). Typically, accurate position information can also be obtained in this zone. The third zone is the far zone, which extends from approximately 10 feet to 80 feet (approximately 3 to 24 meters). In this zone, the positioning unit 110 is able to identify the presence of user devices 103 (or users), but the positioning information is less reliable in this zone.

Figure 6:
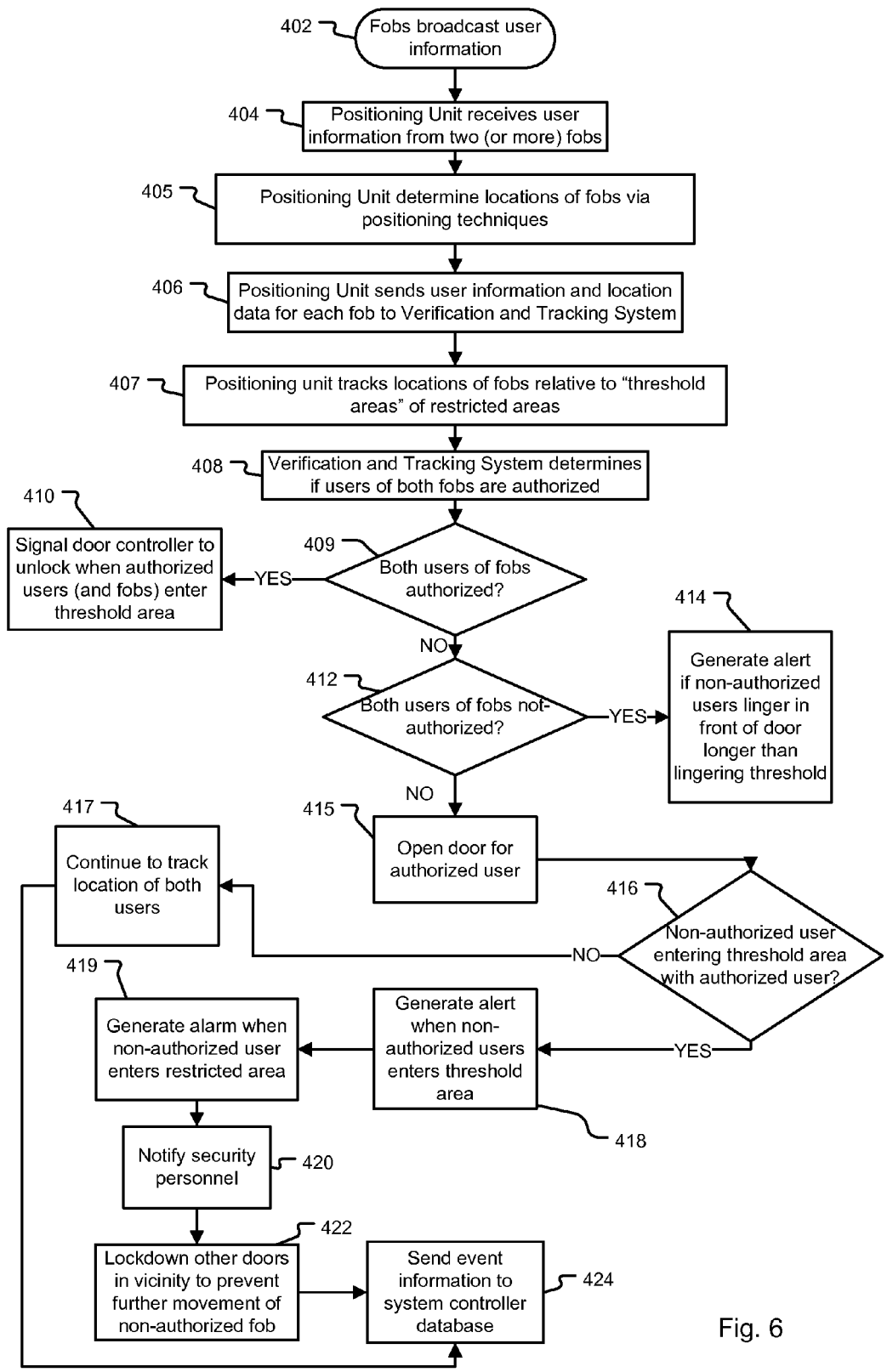
FIG. 6 is a flow diagram illustrating how the security system generates alerts or alarms if users are determined to be "tailgating"

FIG. 6 is a flow diagram illustrating how the security system 100 generates alerts or alarms if users are determined to be "tailgating."

In the first step 402, the user devices 103 broadcast user information as packet (BLE) data. Next, the positioning unit 110 receives the user information (i.e., packet data) from two or more user devices in step 404. The positioning unit 110 determines locations of the user devices 103 via the positioning techniques in step 405. In step 406, the positioning unit 110 sends the user information 105 and the location data 109 for each of the user devices to the verification and tracking system 115. Next, the positioning unit 110 and the tracking system 115 track the locations of user devices 103 relative to the "threshold areas" of the restricted areas in step 407.

The verification and tracking system 115 then attempts to authenticate user information (e.g., users) for both of the user devices 103 in step 408. Additionally, while not illustrated in the figure, the verification and tracking system 115 may optionally validate the user devices 103 in step 408. A validated user device is a valid fob in the possession of the correct user, which is designed to operate with the system. A non-validated user device is a fob or other device belonging to a former employee (which has been de-authorized) or possibly a fob intended for another system or a fob that lacks proper encryption, to list a few examples.

In the next step 409, the verification and tracking system 115 determines if the users of the fobs are authorized. If the user information for both of the fobs is authorized, then the verification and tracking system 115 sends a signal to the door controller 112 (or striker 133) to unlock the door when the authorized fobs (i.e., the users) enter the threshold area near the restricted areas in step 410.

If the users of the fobs are not authorized, then the verification and tracking system 115 determines if the users for both (or all) of the fobs have failed authentication in step 412. If all of the users fail authentication, then the verification and tracking system 115 denies access to the restricted areas. In addition, the tracking system 115 generates an alert if a non-authorized user lingers near the locked door for a length of time that exceeds a lingering threshold in step 414. Typically, this alert is a warning that is sent to security personnel to indicate that a non-authorized user is in the vicinity of a restricted area.

If at least one of the users has been authenticated and one of the users has not been authenticated, the verification and tracking system 115 still unlocks the door for the authenticated (or authorized) user in step 415. The positioning unit 110 then determines if the non-authorized user is attempting to enter the threshold of the restricted area (with the authorized user and user device) in step 416. There are two common scenarios for "tailgating." In the first scenario, one or more users are authenticated and one or more users do not have fobs and are thus not authenticated. In this scenario, the non-authenticated users simply follow behind the authenticated users. In the second scenario, the one or more users are authenticated and one or more users have fobs, but are not authenticated access the restricted area. In this embodiment, the non-authenticated user information for these non-authorized users is retrieved to identify the users.

If the non-authorized user is not attempting to access the restricted area, the verification and tracking system continues to track the location of the non-authorized user in step 417 and sends event information to the system controller 118 to be stored in the system controller database 116 in step 424.

If the non-authenticated user (or users) is entering the threshold of the restricted area with the authorized user, however, then the verification and tracking system generates an alert when the non-authorized user enters the threshold area in step 418. This alert is typically a warning sent to, for example, security personnel, to indicate that a user is potentially about to enter a restricted area. The verification and tracking system 115 generates an alarm if the non-authorized user enters the restricted area in step 419. Security personnel can also be notified in step 420. Next, the verification and tracking system locks other doors (e.g., escape routes) in the vicinity to prevent further movement of the non-authenticated user in step 422. Additionally, the verification and tracking system sends event information to the system controller 118 to be stored in the system controller database 116 in step 424.

Figure 7:
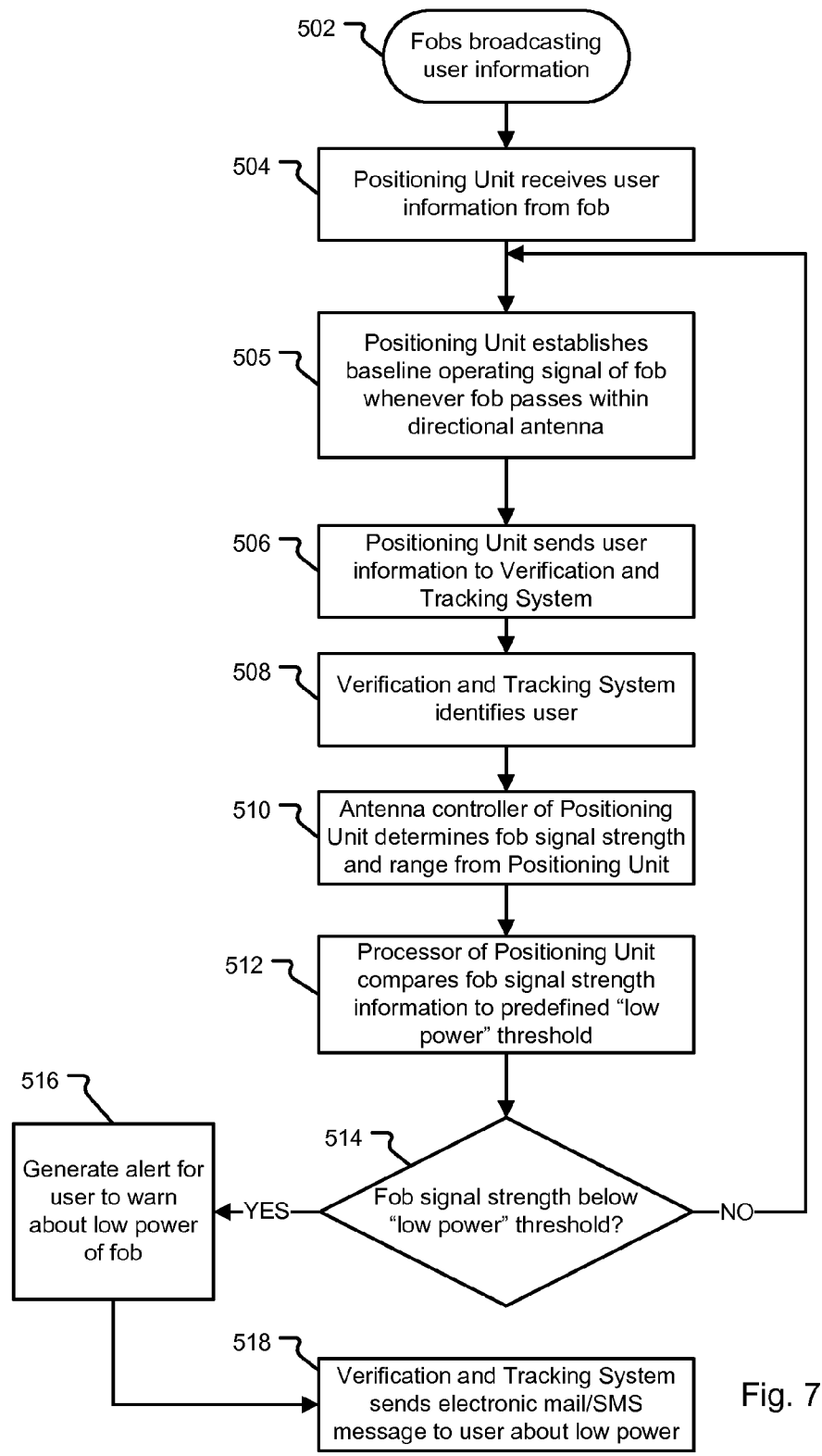
FIG. 7 is a flowchart illustrating power level verification for a fob user device.

FIG. 7 is a flowchart illustrating power level verification for a key fob. In the preferred embodiment, the mobile broadcasting user devices are fobs, which rely on batteries to supply power to the fob (and broadcast user information as packet data). As with all battery powered devices, the batteries and/or the fobs must be periodically charged/replaced. If the battery in the fob dies, then the fob is unable to broadcast the user information and the user is thus not able to be authenticated. Thus, it is important that users are aware of the battery life of their fob.

In the first step 502, one or more fobs are broadcasting user information as packet data. The positioning unit 110 receives the user information in step 504. In the next step 505, the positioning unit 110 then establishes a baseline operating signal level of the fob every time the fob passes within the range of the tracking system. Next, in step 506, the positioning unit 110 sends the user information to the verification and tracking system 115. The verification and tracking system 115 identifies the user in step 508.

The antenna controller 206 of the positioning unit 110 determines the fob's transmission signal strength (e.g., −50 dB) and range in step 510 to provide a general indication of the battery's power. The system obtains signal strength and range information because distance from the positioning unit affects the received signal strength. For example, the positioning unit must be able to distinguish between a device with lower power and a device that is far away from the unit.

As the signal weakens, the antenna controller 206 and processor 204 determine how much longer the battery is able to operate before it lacks sufficient power to broadcast the user information. The processor 204 of the positioning unit 110 then compares the fob signal strength information to a predefined "low power" threshold in step 512.

In the next step 514, the processor 204 determines if the signal strength of the fob is below the low-power threshold. If the fob's signal strength is below the low power threshold, then the positioning unit 110 generates an alert to warn the user about the low-power of their fob in step 516. Next, the verification and tracking system 115 sends an electronic mail or SMS (simple message service) message to the user to indicate that their fob has low-power, in one example.

Alternatively, the alert may be displayed on the display devices 117-1 to 117-n of the security system 100.

Figure 8:
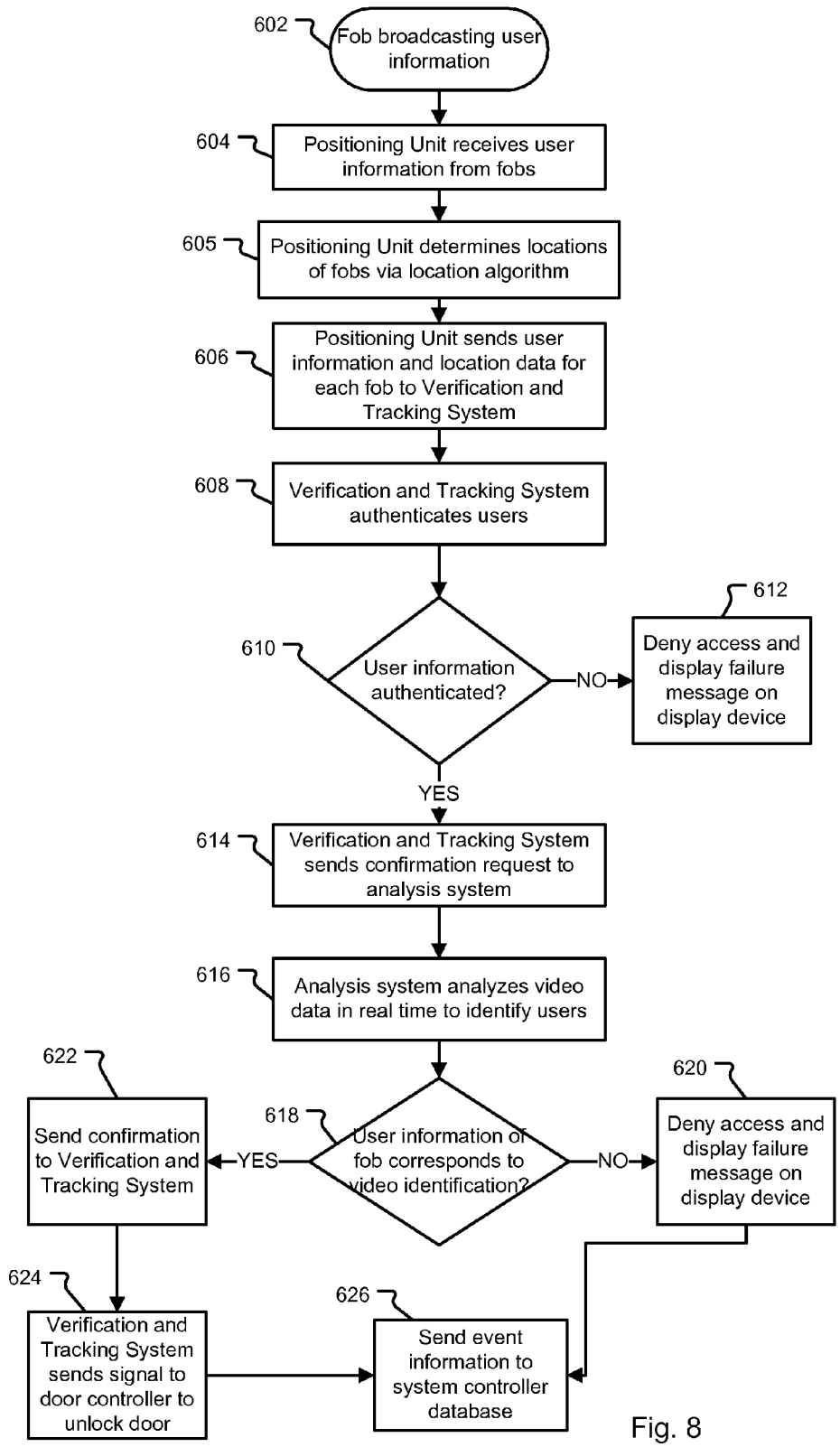
FIG. 8 is a flowchart illustrating how the security system can be integrated with video data from video cameras to provide video verification of the users.

FIG. 8 is a flowchart illustrating an embodiment of the security system 100 that includes video verification of the users.

In the first step 602, one or more fobs or other user devices are broadcasting user information. The positioning unit 110 receives the user information in step 604. The positioning unit 115 then determines locations of user devices via the positioning techniques in step 605, including determining the attenuation difference between two antennas and/or triangulation.

Next, the positioning unit 110 sends the user information 105 and the location data 109 for each fob/user device 103 to the verification and tracking system 115. The verification and tracking system 115 authenticates the users in step 608.

If the user information is not authenticated (step 610), then the verification and tracking system 115 denies access to the restricted area and sends an "access denied" message to be displayed on the display device 117 in step 612. If user information is authenticated, then the verification and tracking system 115 sends a video confirmation request to the video analysis system 120 in step 614. The video analysis system 120 analyzes video data in real-time to identify the users in step 616.

In the next step 618, the verification and tracking system 115 determines if the user information corresponds with video identification provided by the analysis system 120. Identification of the user via the fob and video system allows the video analysis system 120 to perform a 1:1 verification of identity the user in lieu of a 1:N verification, which is less accurate because it only accounts for numbers of users. In a typical implementation, the video analysis system 120 implements, for example, biometric recognition techniques (e.g., facial recognition) to identify the users. Additionally, the use of the video analysis system 120 to identify users along with the verification and tracking system 115 enables the flagging of individuals that are not enrolled in the system (e.g., not carrying a user device), but are within a restricted area of the building 102.

Illustrated by way of example, if the verification and tracking system 115 authenticates two users and the video analysis system 120 verifies the identities of the two users, then the user information would correspond to the video identification. Conversely, if the verification and tracking system 115 authenticates two fobs (i.e., users), but the video analysis system 120 identifies different users, then the user information would not correspond to the video analysis. In an alternative embodiment, the video analysis system 120 may also identify that the number of users does not correspond to the number of identified fobs. For example, if the verification and tracking system 115 authenticates two (2) fobs, but the video analysis system 120 identifies three users, then the user information would not correspond to the video identification. Returning to step 618 of FIG. 8, if the user information corresponds to the video analysis, then the video analysis system 120 sends a confirmation to the verification and tracking system 115 in step 622. In the next step 624, the verification and tracking system 115 sends a signal to the door controller 112 to unlock the door and grant access to the restricted area. Next, the verification and tracking system sends event information to the system controller 118 to be stored in the system controller database 116 in step 626. If the user information does not correspond to the video analysis, then the verification and tracking system 115 denies access to the restricted area and sends a message to be displayed on the display device in step 620. Next, the verification and tracking system sends event information to the system controller 118 to be stored in the system controller database 116 in step 626.

Figure 9:
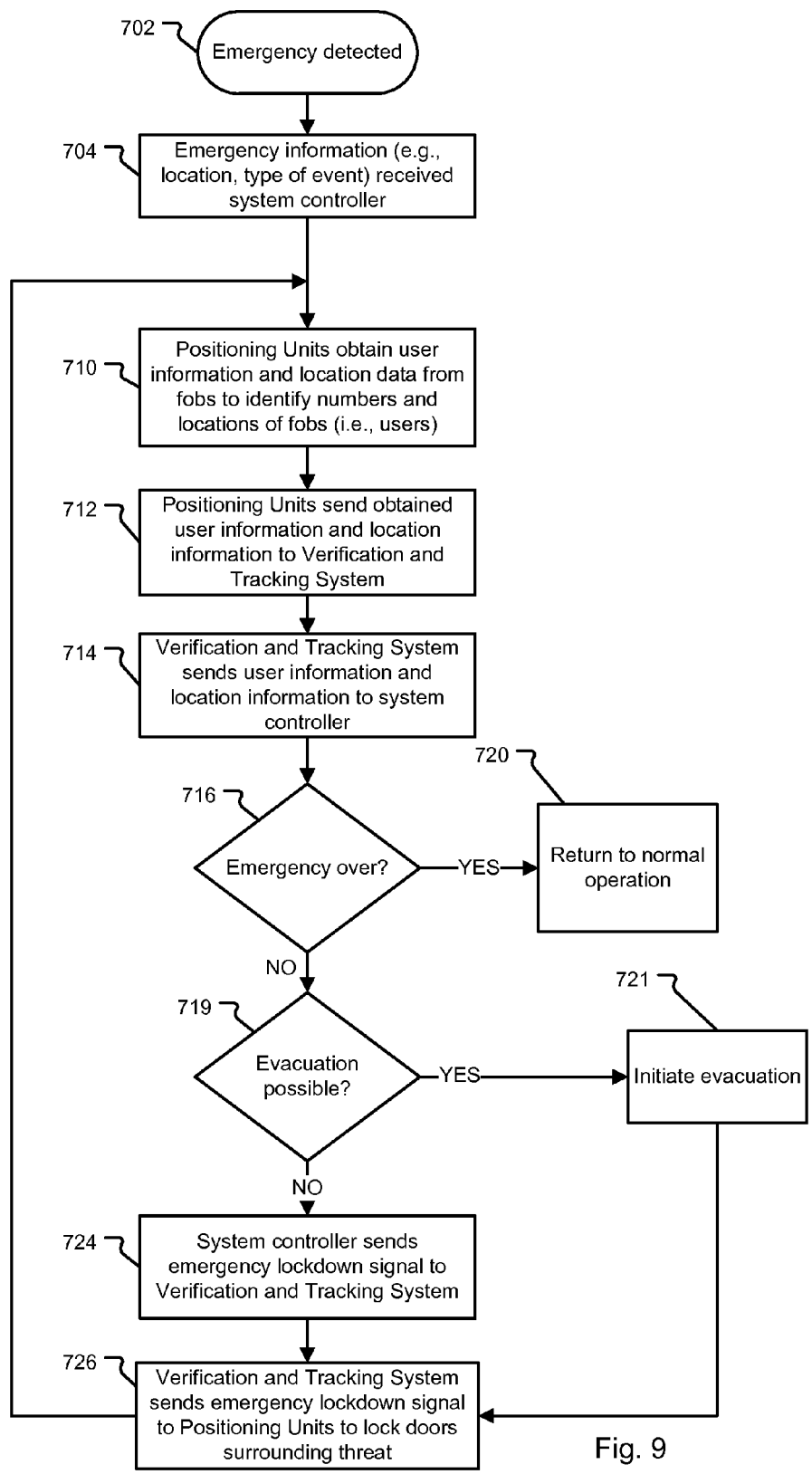
FIG. 9 is a flow diagram illustrating how the security system is able to control access throughout a building in response to an emergency situation.

FIG. 9 is a flow diagram illustrating how the security system 100 is able to control access throughout the building 102 in response to an emergency situation (e.g., fire, prison riots, shooter in school, a missing child/person in store or building).

In the first step 702, an emergency situation is detected. This could be detected by the security system 100, a fire alarm situation, or is manually activated by security personnel, to list a few examples. Next, emergency information (e.g., event location and type of emergency event) is received by the system controller 118 in step 704.

In the next step 710, the positioning units 110-1 to 110-n obtain user information 105 and location data 109 to identify numbers and locations of all of the user devices (and thus the users). The positioning units 110-1 to 110-n send the user information 105 and location data 109 to the verification and tracking system 115 in step 712. The verification and tracking system 115 sends the user information to the system controller 118 in step 714, which stores the information in the system controller database 116.

If the emergency is over (step 716), then the system controller 118 disables the emergency lockdown of all the access points (e.g., doors) within the building in step and returns to a normal operation mode in step 720. After the emergency situation has ended, the system controller 118 receives an indication that the emergency situation has ended and returns to normal operation in step 720. If the emergency is not over (step 716), then the system controller 118 and/or the verification and tracking system 115 determines if evacuation is possible based on the locations of the users and the location of the emergency situation in step 719.

If evacuation is not possible, then the system controller sends emergency lockdown signal to the verification and tracking system 115 in step 724. The verification and tracking system forwards the emergency lockdown signal to positioning units to lock doors surrounding threat in an attempt to contain the threat in step 726.

If, however, evacuation is possible, then the verification and tracking system 115 initiates an evacuation of the building in step 721. In one example, audible and/or visual messages are displayed on the display devices 117-1 to 117-n with evacuation information (evacuation route, routes to avoid, etc.). Additionally, as users move through the building they are "handed off" to other positioning units 110 and additional information may be displayed on the display devices 117-1 to 117-n with further instructions as the situation develops.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system, comprising:
    user devices that transmit wireless signals including packet data, wherein the packet data includes user information;
    access points that provide access to restricted areas; and
    positioning units located near the access points that include two or more antennas, wherein each of the positioning units receive the wireless signals from the user devices, and determine locations of the user devices relative to the access points,
    wherein each of the positioning units includes a first omnidirectional antenna that receives the wireless signals from the user devices when the user devices are located beyond a threshold area of the access points, and a directional antenna that receives the wireless signals from the user devices when the user devices are located within a threshold area of the access points.

2. A security system, comprising:
    user devices that transmit wireless signals including packet data, wherein the packet includes user information;
    access points that provide access to restricted areas;
    positioning units located near the access points that include two or more antennas, wherein each of the positioning units receive the wireless signals from the user devices, and determine locations of the user devices relative to the access points; and
    wherein the antennas of the positioning units are Bluetooth Low Energy (BLE) antennas.

3. The system of claim 1, wherein the positioning units determine the locations of the user devices relative to the access points by comparing attenuation of the wireless signals received between the two or more antennas.

4. The system of claim 1, wherein a verification and tracking system authorizes the user devices by authenticating the user information broadcast by the user devices.

5. The system of claim 4, further comprising door controllers that lock and unlock door access points, and wherein the positioning units send signals to the door controllers to unlock the door access points to provide access to the restricted areas of the building.

6. The system of claim 4, further comprising door controllers that lock and unlock door access points, and wherein a verification and tracking system sends signals to the door controllers to unlock the door access points to provide access to the restricted areas of the building.

7. The system of claim 1, wherein the user devices include mobile phones and fobs.

8. The system of claim 1, further comprising:
video cameras that capture video data of users carrying the user devices; and
a video analysis system that accepts the video data from the video cameras over a network, and verifies identities of the users carrying the user devices from the video data.

9. The system of claim 2, wherein a first antenna of the positioning units is an omnidirectional antenna and a second antenna of the positioning units is a directional antenna.

10. The system of claim 9, wherein each of the positioning units includes a first omnidirectional antenna that receives the wireless signals from the user devices when the user devices are located beyond a threshold area of the access points, and a directional antenna that receives the wireless signals from the user devices when the user devices are located within a threshold area of the access points.

11. A security system, comprising:
user devices that transmit wireless signals including packet data, wherein the packet data includes user information;
access points that provide access to restricted areas; and
positioning units located near the access points that include two or more antennas, wherein each of the positioning units receive the wireless signals from the user devices, and determine locations of the user devices relative to the access points;
wherein each of the positioning units include: a first omnidirectional antenna mounted to an exterior of the positioning units; and a grounded enclosure including a second omnidirectional antenna to form a directional antenna.

12. A security system, comprising:
user devices that transmit wireless signals including packet data, wherein the packet data includes user information;
access points that provide access to restricted areas;
positioning units located near the access points that include two or more antennas, wherein each of the positioning units receives the wireless signals from the user devices, and determines locations of the user devices relative to the access points; and
door controllers that lock and unlock door access points, and wherein a verification and tracking system authorizes the user devices by authenticating the user information broadcast by the user devices and sends signals to the door controllers to unlock the door access points to provide access to the restricted areas of the building in response to the verification and tracking system determining that the user devices are authorized and in response to the positioning units determining that the user devices are located within a threshold area of the access points and remain within the threshold area for at least a lingering threshold value.

13. A method for tracking and authorizing user devices in a security system, the method comprising:
the user devices transmitting wireless signals including packet data, wherein the packet data includes user information;
receiving the wireless signals from the user devices via positioning units including two or more antennas,
the positioning units determining locations of the user devices relative to access points; and
a verification and tracking system sending the signals to the door controllers to unlock the door access points in response to the verification and tracking system determining that the user devices are authorized and in response to the positioning units determining that the user devices are located within a threshold area of the door access points and also remain within the threshold area for at least a lingering threshold value.

14. The method of claim 13, further comprising the positioning units determining the locations of the user devices relative to the access points by comparing attenuation of the wireless signals received between the two or more antennas.

15. The method of claim 13, further comprising the positioning units determining the locations of the user devices relative to the access points by determining a time of flight of the wireless signals received at the two or more antennas.

16. The method of claim 13, further comprising the positioning units determining the locations of the user devices relative to the access points by using triangulation of the wireless signals received at the two or more antennas.

17. The method of claim 13, further comprising the verification and tracking system authorizing the user devices by authenticating the user information associated with the user devices.

18. A method for tracking and authorizing user devices in a security system, the method comprising:
the user devices transmitting wireless signals including packet data, wherein the packet data includes user information;
receiving the wireless signals from the user devices via positioning units including two or more antennas;
the positioning units determining locations of the user devices relative to access points by using an omnidirectional antenna that receives the wireless signals from the user devices when the user devices are located beyond a threshold area of the access points, and a directional antenna that receives the wireless signals from the user devices when the user devices are located within a threshold area of the access points; and
providing access to restricted areas via the access points based on the determined locations.

19. The method of claim 18, further comprising:
capturing video data of users carrying the user devices; and
analyzing the video data to verify identities of the users carrying the user devices from the video data.

20. A positioning unit for monitoring wireless user devices relative to an access point of a building, the positioning unit comprising:
an omnidirectional antenna that detects BLE signals from the wireless user device; and
a directional antenna that is used to determine whether the user devices are located within a threshold area of the access point and also remain within the threshold area for at least a lingering threshold value.

21. The unit of claim 20, in which signals are sent to door controllers that lock and unlock door access points based on whether the user devices are determined to be located within the threshold area.

* * * * *